US008230614B2

(12) United States Patent  
Tritz (10) Patent No.: US 8,230,614 B2
(45) Date of Patent: Jul. 31, 2012

(54) CONFIGURABLE APPARATUS FOR DRYING HOOFS ON HOOFED ANIMALS

(76) Inventor: Donald R. Tritz, Genoa City, WI (US)

( * ) Notice: Subject to any disclaimer, the term of this patent is extended or adjusted under 35 U.S.C. 154(b) by 307 days.

(21) Appl. No.: 12/634,430

(22) Filed: Dec. 9, 2009

(65) Prior Publication Data

US 2010/0083522 A1    Apr. 8, 2010

Related U.S. Application Data

(63) Continuation-in-part of application No. 11/180,866, filed on Jul. 12, 2005.

(60) Provisional application No. 60/587,271, filed on Jul. 12, 2004.

(51) Int. Cl.
*F26B 3/04* (2006.01)
*F26B 19/00* (2006.01)
*F26B 25/06* (2006.01)

(52) U.S. Cl. .......... 34/201; 342/218; 342/225; 342/226; 342/231; 342/233

(58) Field of Classification Search .................... 34/201, 34/218, 222, 224, 225, 226, 229, 231, 232, 34/233, 237
See application file for complete search history.

(56) References Cited

U.S. PATENT DOCUMENTS

| | | | |
|---|---|---|---|
| 4,183,323 A | 1/1980 | Maines | |
| 4,211,185 A | 7/1980 | Karlsson | |
| 4,258,248 A | 3/1981 | Campo | |
| 4,559,903 A | 12/1985 | Bloom | |
| 5,003,923 A | 4/1991 | Morgan | |
| 5,025,572 A | 6/1991 | Cordier | |
| 5,283,962 A | 2/1994 | Humann | |
| 5,416,886 A | 5/1995 | Zahler | |
| 5,613,304 A | 3/1997 | Lin | |
| 5,930,912 A | 8/1999 | Carder | |
| 6,058,886 A | 5/2000 | Haines | |
| 6,393,717 B1 | 5/2002 | Santos | |
| 6,560,779 B1 | 5/2003 | Savage | |
| 2006/0005419 A1 | 1/2006 | Tritz | |

FOREIGN PATENT DOCUMENTS

| | | |
|---|---|---|
| DE | 103 12 975 A1 | 11/2003 |
| FR | 2 258 123 A | 8/1975 |
| FR | 2 580 467 A | 10/1986 |

OTHER PUBLICATIONS

International Search Report for PCT/US2005/024,587.

*Primary Examiner* — Jiping Lu
(74) *Attorney, Agent, or Firm* — Lesavich High-Tech Law Group, P.C.; Stephen Lesavich

(57) ABSTRACT

A configurable hoof drying apparatus. The drying components of the apparatus are selectable, configurable and interchangeable for desired drying needs and change a pressure, speed and temperature of an original drying air source. Therefore it can be used with a hot/warm/cool/cold air drying source. The hoof drying apparatus is portable and specifically designed, but is not limited to, drying hooves for the purposes of: hoof wall repair, preparation for medication for hoof diseases and preparation of the hoof for application of hoof dressings and hoof shoes. The hoof drying apparatus can also be used for drying non-hoofed animals.

12 Claims, 11 Drawing Sheets

FIG. 1A

FIRST

SECOND

CONFIGURABLE APPARATUS FOR DRYING HOOFS ON HOOFED ANIMALS

CROSS REFERENCES TO RELATED APPLICATIONS

This application is a Continuation-In-Part (CIP) of U.S. patent application Ser. No. 11/180,866, filed Jul. 12, 2005, claims priority to U.S. Provisional Patent Application 60/587,271, filed, Jul. 12, 2004, the contents of all of which are incorporated by reference.

FIELD OF THE INVENTION

This invention relates to drying apparatus. More specifically, it relates to a configurable apparatus for drying hoofs of hoofed animals.

BACKGROUND OF THE INVENTION

Many animals such as horses and cows have hooves. For example, a typical horse hoof comprises three parts, the sole, wall and frog.

The "sole" holds the weight of a horse. The sole is connected to the hoof wall.

The "hoof wall" is formed at a corner of the sole where skin like cells mix with horny tissue to form a hard hoof wall. The hoof wall has a inner layer of laminae which locks together with a second set of laminae. The second set of laminae is attached to the pedal bone and holds the hoof firmly in place.

At the horse's heel, the hoof wall turns inward toward the "frog." The frog forms the bars of the foot, which slightly gives when the horse makes contact with the ground, absorbing some of the impact. A well shaped frog touches the ground when a horse moves.

A horse hoof is comprised of a large percentage of water and are similar in hardness and texture to human fingernails. Horse hooves typically reflect their environment. Wet conditions produce soft hoof walls. Dry conditions produce hard hoof walls and dirty conditions produce unhealthy hooves.

Horses in their natural environment care for their own hooves during their constant ranging for forage. Horses in captivity typically require hoof care by their owners. Such hoof care typically includes scrapping and shaving, applying "horse shoes," applying medicines, etc.

It is difficult to apply horse shoes to wet horse hoofs since horse hooves can become "mushy" much like human fingernails after prolonged soaking, leading to less rigidity in the hoof wall. This can cause shoes to loosen due to the tendency for the clinches to pull through or "pop." This also can lead to a tearing of the hoof wall, making re-application of the shoes more difficult.

Excess flexibility of the hoof wall due to wet hooves can lead to the foot spreading out over the sides of the horse shoe. This results in a loss of support and potential for lameness or injury.

Excessively wet or soft hooves are more sensitive making them more difficult to shoe. Sensitive hoofs lead to soreness, bruising, and lameness when the horse is worked on hard ground or over stones.

Horse hooves often need to be quickly dried for example, for hoof wall repair, preparation for medication for hoof diseases such as thrush and white-line disease, and preparation of the hoof for application of hoof dressings.

There is a need to quickly and efficiently dry horse hooves for these and many other reasons. However, there are many problems associated with dryers for horse hoofs know in the art. One problem is that most dyers known in the art are not specifically designed or suited to drying horse hoofs or the hoofs of other hoofed animals. Another problem is that such dyers often scare or spook horses and other hoofed animals.

Another problem is that such dryers are typically used around and on top of a hoof and do not dry hoofs from underneath or from the bottom to the top. Another problem is that such dryers typically do not allow a hoofed animal insert a hoof into the drying apparatus. Another problem is that such dryers are not portable.

Another problem is that such dryers are not configurable. Another problem is that characteristics of a drying air flow cannot be changed or altered.

Thus, it is desirable to provide a dyer to dry the hoofs of hoofed animals that solves one or more of the described problems.

SUMMARY OF THE INVENTION

In accordance with preferred embodiments of the present invention, some of the problems associated with drying the hoofs of hoofed animals are overcome. A configurable apparatus for drying hoofs on hoofed animals is presented.

The drying components of the apparatus are selectable, configurable and inter-changeable for desired drying needs and change a pressure, speed and temperature of an original drying air source. Therefore it can be used with a hot/warm/cool/cold air drying source. The hoof drying apparatus is specifically designed, but is not limited to accommodate hoofed animals such as horses, cows, buffalo, antelope, etc. prevent a variety of problems and improve the general health of the hoofed animal. The hoof drying apparatus can also be used for non-hoofed animals.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1A:
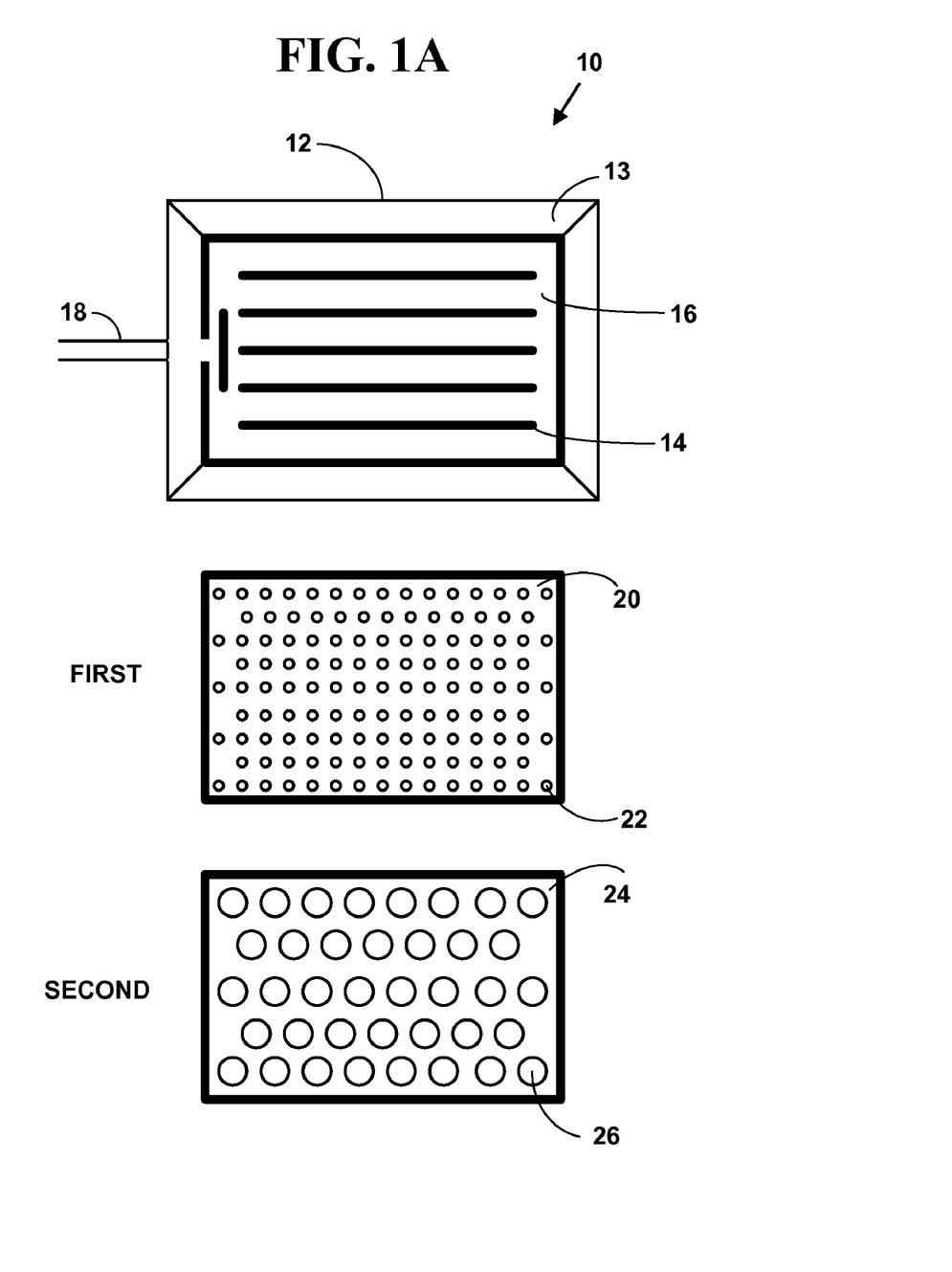
FIG. 1A is a block diagram illustrating an exploded top view of a first exemplary embodiment of a hoof drying apparatus.

FIG. 1A is a block diagram illustrating an exploded top view of an exemplary hoof drying apparatus 10. The hoof drying apparatus 10 comprises a raised base platform 12 with a first inner space hollow portion 16 and a second raised solid portion 13.

In one embodiment of the invention, the dimensions of second raised solid portion 13 of the base platform 12 is about thirty-six inches long and about eighteen inches deep and about four inches high. The length, width and height are specifically selected and sized to accommodate either a small step for one or more hoofs from a hoofed animal such as a horse, cow, buffalo, antelope, etc. However, the present invention is not limited to such measurements and the base platform 12 and the second raised solid portion 13 are not limited to these measurements and other measurements can be used to practice the invention. The height of the raised solid portion 13 is also selected to include plural air mats (e.g., 20, 24, etc.) therein.

The present invention can also be used with non-hoofed animals such as dogs, cats, and other small animals. In such an embodiment, the whole non-hoofed animal is placed in the raised based platform 12.

In one embodiment of the invention, the raised base platform 12 comprises a rigid rubberized material. However, the present invention is not limited to such an embodiment and other materials such as plastic, metals, other rubberized, composite materials, mylar and wood can be used for the raised base platform 12.

The second raised solid portion 13 of the base platform 12 is raised and is designed to have a raised height to allow a hoof of hoofed animal to be dried in wet conditions, and even in standing water, deep mud, etc. if necessary. However, the step is not too high to make the animal un-comfortable or cause the animal pain.

The raised base platform 12 comprises plural air chamber dividers 14 placed in the first inner space hollow portion 16. The plural air chamber dividers 14 direct air into the second raised portion 13 of base platform 12 from a hollow air connector 18 in the first inner space hollow portion 16. In one embodiment of the invention the plural air chamber dividers 14 have a width and depth of approximately one inch and are rigid. In another embodiment, the plural air chamber dividers 14 a flexible and compressible.

The length is sized to fit within the first inner space portion 16 and is variable and dependent of the size of the first space. However, the present invention is not limited to such measurements and plural air chambers 14 of other measurements can be used to practice the invention.

In one embodiment of the invention, the plural air chamber dividers 14 comprise a rigid rubberized material. The rigid rubberized material is capable of supporting the weight of a heavy hoofed animal without collapsing. However, the present invention is not limited to such an embodiment and other materials such as plastic, metals, composite materials and wood can be used for the plural air chamber dividers 14.

In one embodiment of the invention, the plural air chambers 14 comprise a compressible rigid rubber material. The rigid rubberized material is capable of supporting the weight of a heavy hoofed animal without collapsing but does compress under the weight of a heavy hoofed animal. This allows a heavy hoofed animal to step down with a hoof and compress the plural air chambers without experiencing pain.

Figure 1B:
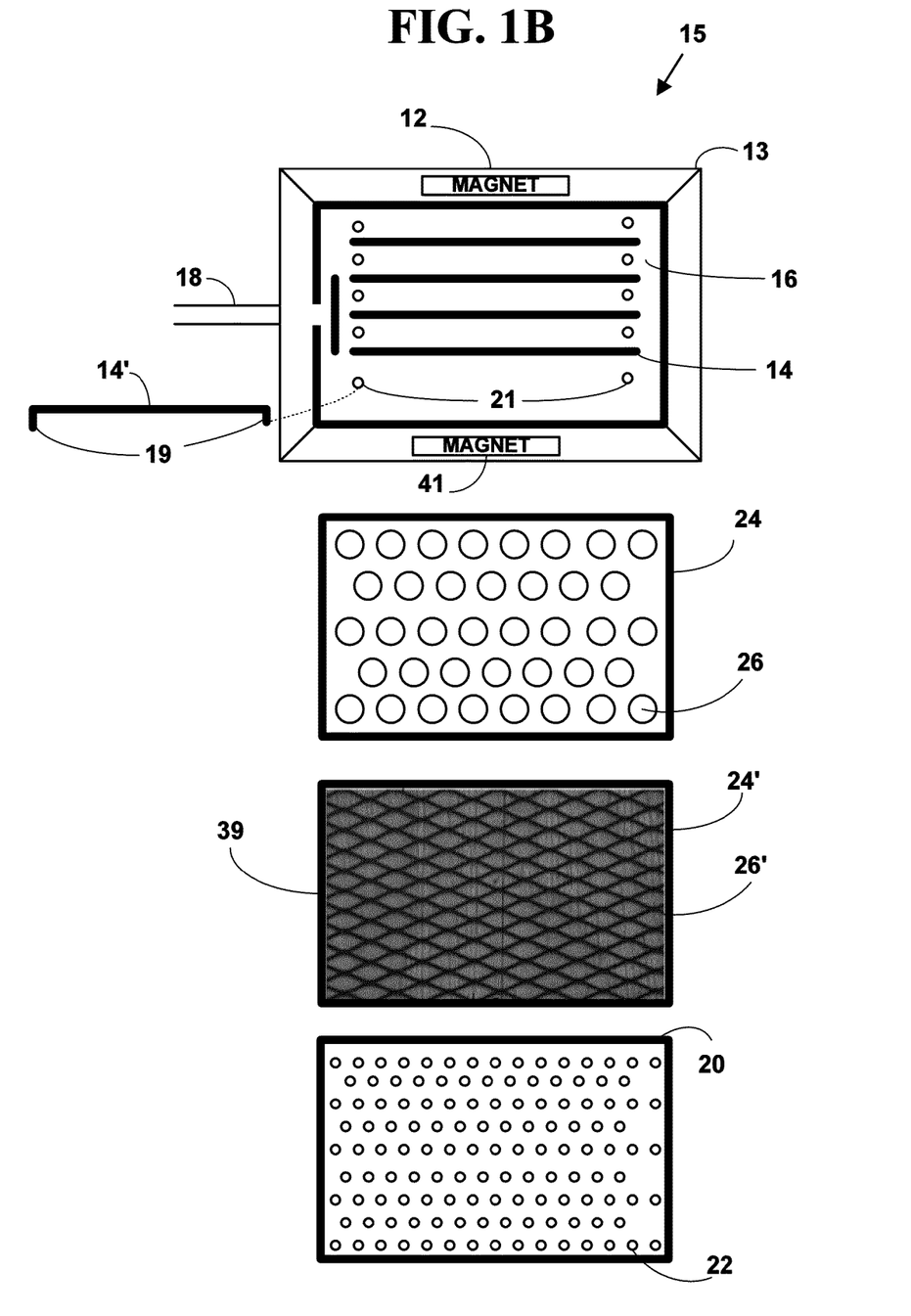
FIG. 1B is a block diagram illustrating an exploded top view of a second exemplary embodiment of a hoof drying apparatus.

In one embodiment of the invention, the plural air chambers dividers 14 are configurable by a user for multiple types of sized and shaped hoofs of hoofed animals. In such an embodiment, the plural air chamber dividers 14' further include protruding pins 19 that are inserted in pre-drilled openings 21 in the raised base platform 12 to direct drying airflow for a specific size and type of hoofed animal (one divider 14' is illustrated in FIG. 1B).

In another embodiment of the invention, the plural air chamber dividers 14 are not configurable and installed during manufacturing. In such an embodiment, the hoof drying apparatus 10 would be purchased to dry hoofs of a specific type of hoofed animal (e.g., a horse, cow, buffalo, antelope, an adult animal, a non-adult animal, etc.).

The hoof drying apparatus 10 with the plural air chamber dividers 14 is specifically sized and shaped to accommodate one or more hoofs of a hoofed animal and to thoroughly dry a bottom, one or more side portions and top portion of a hoof from the bottom to the top, therefore thoroughly drying the hoof.

In one embodiment of the invention, the hollow air container 18 is a rigid plastic material. However, the present invention is not limited to such an embodiment and other materials such as rubbers, metals, composite materials and wood can be used for the hollow air container 18. The hollow air container 18 allows an external drying device 30 (FIG. 2) to be attached to the hoof drying apparatus 10. The external drying device 30 can be a hot air device such as a heater or a cool air device such as a fan, a vacuum cleaner with the suction reversed to blow air instead, etc. However, the present invention is not limited to these devices and other devices can also be used to provide the air flow and used to practice the invention.

The hoof drying apparatus 10 further comprises plural air mats each with openings of different sizes and each comprising an identical material and/or each comprising a different material. In one embodiment, and for most of the descriptive examples herein, two air mats are used. However, the present invention is not limited to two air mats, and more or fewer air mats can be used to practice the invention.

In one exemplary embodiment, a first air mat 20 with plural openings of a first size 22 is used. The dimension of the first air mat 20 specifically selected and sized to fit full into the first inner space 16 and cover the plural air chamber dividers 14. The plural openings of a first size 22 include, circular, diamond, hexagon, octagon or other shaped openings.

The openings 22 on the first air mat 20 are configured in rows of openings 22. The rows of openings 22 in the first air mat 20 extend from a left side to a right side and from a top to a bottom of the first air mat 20. When the first air mat 20 is placed over the plural air chamber dividers 14 and in the base 12, the rows of openings 22 extend from a left side to a right side and top to a bottom in the base 12, thereby providing a complete coverage of a surface area first inner space portion 16 of the base 12. In other words, the only solid portions of the first air mat 20 includes the connection between the rows of openings 22.

In one embodiment of the invention, the first air mat 20 comprises a flexible rubberized material. The flexible rubberized material is capable of support the weight of a hoofed animal and is soft and flexible. The soft and flexible materials are compressible by the hoofed animal when their weight is applied. The soft and flexible materials allow the hoofs of a hoofed animal with sensitive or diseased hoofs to be dried without pain. However, the present invention is not limited to such an embodiment and other materials such as plastic, metals, composite materials and wood can be used for the first air mat 20.

The hoof drying apparatus 10 further comprises a second air mat 24 with plural openings of a second size 26. The dimension of the second air mat 24 are also specifically selected and sized to fit into the first inner space 16 and aligned to cover selected ones of the plural air openings of the first size. The plural openings of the second size 26 include, circular (e.g., FIGS. 1-5), diamond (e.g., FIG. 6), hexagon, octagon or other shaped openings. For example, in one embodiment, the plural air openings of the second size are aligned to include one or more air openings of the first size.

The openings 26 on the first air mat 24 are configured in rows of openings 26. The rows of openings 26 in the second air mat 24 extend from a left side to a right side and from a top to a bottom of the second air mat 24. When the second air mat 24 is placed over the plural air chamber dividers 14 and in the base 12, the rows of openings 26 extend from a left side to a right side and top to a bottom in the base 12, thereby providing a complete coverage of the first inner space portion 16 of the base 12.

Figure 6:
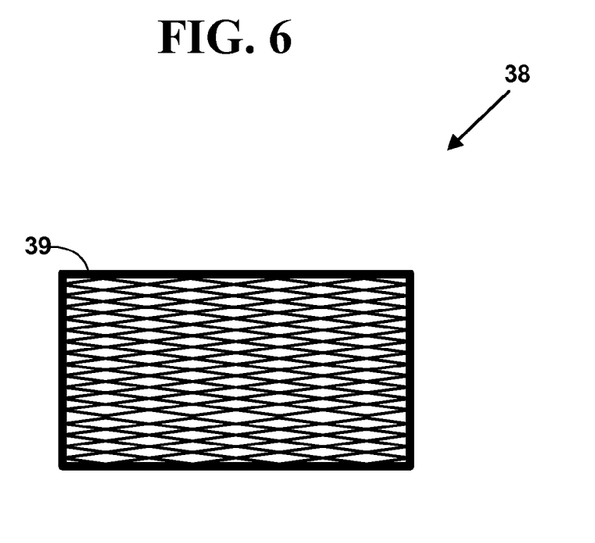
FIG. 6 is a block diagram of a top view of a first air mat made out of expanded metal.

FIG. 1B is a block diagram 15 illustrating an exploded top view of a second exemplary embodiment of a hoof drying apparatus 12' (twelve prime). In this embodiment, the first air mat 24, 24' includes larger openings 26, 26' than openings 22 in the second air mat 20. FIG. 1B illustrates a first air mat 24 with circular openings and a first air mat 24' with diamond shaped openings 26'. FIG. 1B further illustrates the first air mat 24' comprising an expanded metal material 39 (FIG. 6). Either one or both of the first air mats 24, 24' can be used in the apparatus 12.

In one embodiment of the invention, the plural openings of the second size 26 are larger than the plural openings of the first size 26 as is illustrated in FIG. 1A. The plural openings of the second size 26 overlap one or more openings of the first size 22.

In another embodiment, the plural openings of the second size 22 are smaller than the plural openings of the first size 26 as is illustrated in FIG. 1B. In such an embodiment, the plural openings of the first size 26 overlap one or more openings of the second size 22.

Figure 5:
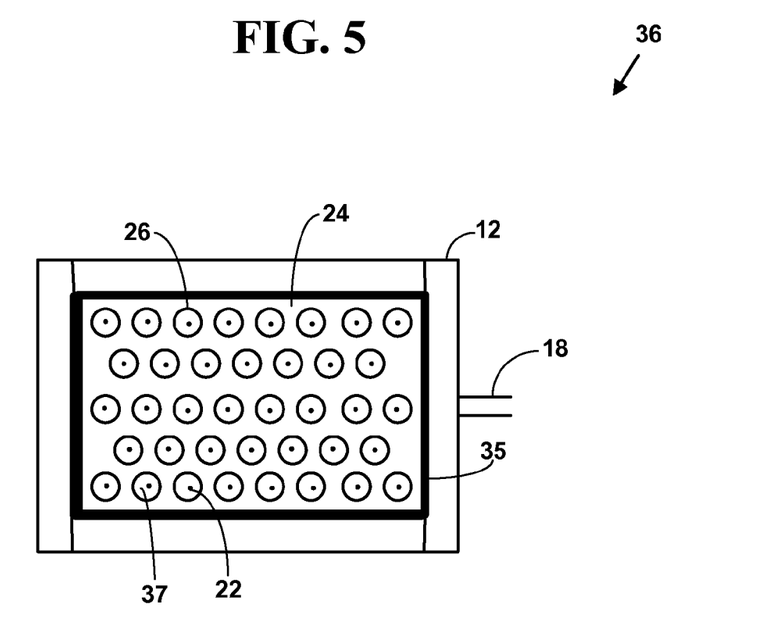
FIG. 5 is a block diagram of a top view of the hoof drying apparatus of FIG. 1 comprising components of other materials.

In another embodiment, exactly one large opening overlaps exactly one small opening (e.g., FIG. 5, etc.). In another embodiment, one large opening overlaps and/or is overlapped by plural small openings (e.g., FIG. 8, etc.).

The components of the hoof drying apparatus 10 are selectable, configurable and inter-changeable based on desired drying needs. The materials for the first air mat 20 and the second air mat 24 selected. They can be identical or different. For example, the materials for the first air mat 20 and the second air mat 24 can be selected from materials including compressible rubbers, hard rubbers, plastics, composite materials, expanded metals, other metals mylars, etc. The size of openings for the first air mat 20 and the second air mat 24 are selected. For example, the size of the openings for plural air mats can vary from very small to very large. In one embodiment, the apparatus 10 includes plural air mats that are selected from a set of airs included with the apparatus 10 that includes air mats in a selection of materials with a selection of different size openings.

The selected first air mat 20 and the second air mat 24 are placed in a desired order in the base 12 depending on the type of desired drying needs and/or a health associated with a hoofed animal.

In one embodiment illustrated by the FIG. 1A, a first air mat 20 with small openings 22 is placed on directly on top of the plural air chamber dividers 14 and makes direct contact with the dividers 14. The second air mat 24 with larger openings 26 is placed directly on top of the first air mat 20 and makes direct contact with the first air mat. This configuration is also illustrated by FIGS. 1-5.

Figure 7:
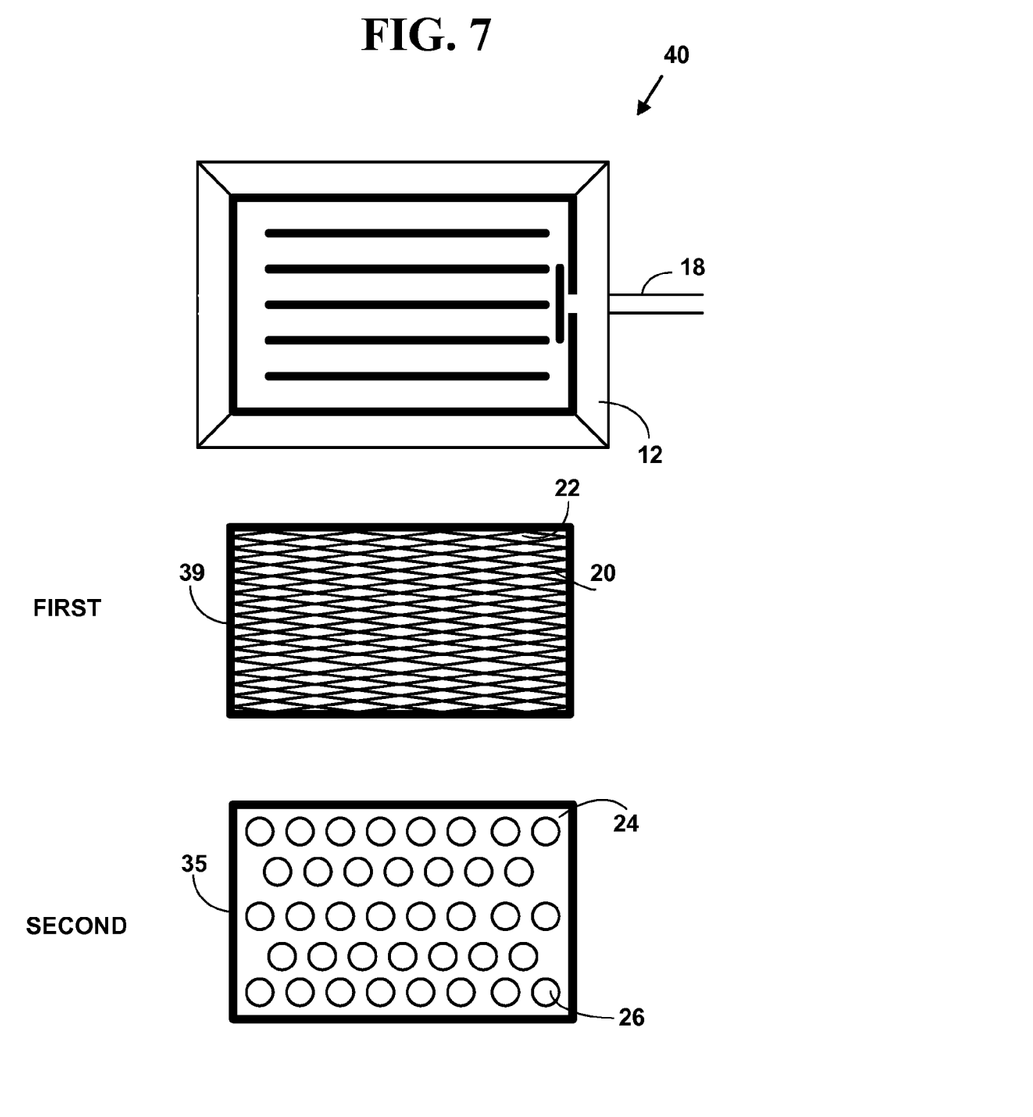
FIG. 7 is a block diagram of a exploded top view of the hoof drying apparatus of FIG. 1.
Figure 8:
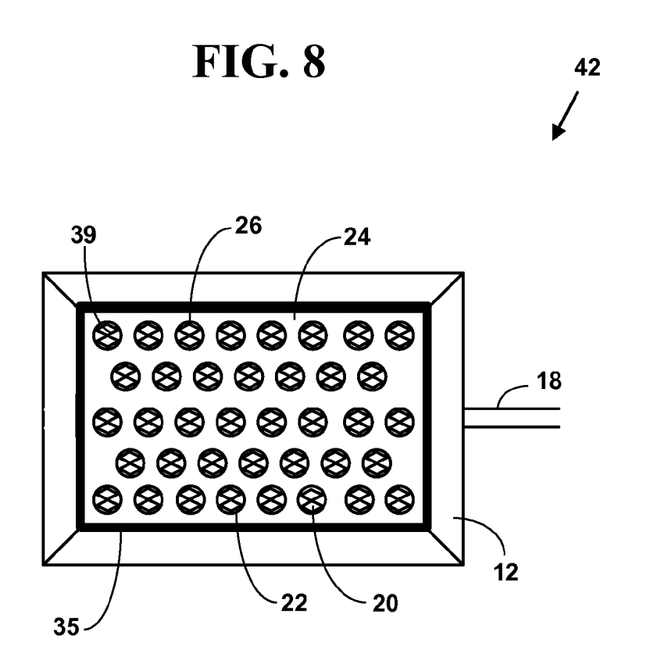
FIG. 8 is a block diagram of a non-exploded top view of the hoof drying apparatus of FIG. 1 comprising components of other materials.

In another embodiment illustrated by the FIG. 1B, the first air mat 24 with larger openings 26 is placed on directly on top of the plural air chamber dividers 14 and makes direct contact with the dividers 14. The second air mat 20 with smaller openings 22 is placed directly on top of the first air mat 24 and makes direct contact with the first air mat 24. This configuration is also illustrated by FIG. 6-8. However, in FIGS. 6-8, the first air mat comprises an expanded metal material (FIG. 6) in which the openings are diamond shaped instead of circular.

In all embodiments, the plural openings of different sizes provide an additional "air cushion" and "drying air current" for the hoofed animal as drying air is forced through and between the different sized openings.

As is known in the mechanical arts, when air is forced out of a smaller sized opening (where the pressure is lower) into a larger size opening (where the pressure is higher) a faster flow from the smaller opening size is transformed into slower flow at the larger opening (FIGS. 1A, 2-5)

Conversely, when air is forced out of a large sized opening into a smaller size opening a slower flow at the larger opening is transformed into a faster flow at the smaller opening. (FIGS. 1B, 6-8) Changes in flow through different size openings also changes the temperature of the air.

The temperature of the air can be adjusted according to the Universal Gas Law illustrated in Equation 1.

$$PV=nRT, \qquad (1)$$

wherein P=Pressure of the gas, V=Volume occupied by the gas, N=Number of molecules in the gas, n=number of gram moles of the gas, R=a gas constant for a specific gas used and T=temperature of the gas. Since Pressure and Temperature are proportional (i.e., are on opposite sides of the equal sign) an increase in pressure results in an increase in temperature and a lower pressure results in a lower temperature.

In one embodiment of the invention, the change in size from the smaller openings in the first air mat 20 to the larger opening size in the second air mat 24 also changes the air flow speed, pressure and temperature (i.e., slower speed, higher pressure, higher temperature) which helps to dry hoofs quicker.

In another embodiment of the invention, the change in size from larger openings in the first air mat 20 to smaller opening size the second air mat 24 also changes the air flow speed, pressure and temperature (i.e., faster speed, lower pressure, lower temperature) which helps to dry hoofs quicker.

In apparatus 10, the changes in an air flow speed and pressure are adjusted according to "Bernoulli's principles." As is known in the mechanical engineering arts, Bernoulli's principles states in part that for a given air flow, an increase in the speed of the air flow occurs simultaneously with a decrease in pressure and/or a decrease in the air flow's potential energy and a decrease in the speed of an air flow occurs simultaneously with an increase in pressure and/or an increase in the air flow potential energy.

If air is flowing between containers, its speed increases because the air flow has moved from a region of higher pressure to a region of lower pressure; and if its speed decreases, it has moved from a region of lower pressure to a region of higher pressure. Consequently, within an air flow, the highest speed occurs where the pressure is lowest, and the lowest speed occurs where the pressure is highest.

One new, novel, unique and unexpected features of the present invention that could not be predicted from the prior art is that the openings in the air mats do not need to be any specific size, just be different in size to achieve the desired drying effects. As a result the air flow that enters the apparatus 10 need not be a warm and/or hot air flow from a heater, but can be a cool and/or cold air flow, such as a simple reverse air flow from a vacuum cleaner, or cold air flow from a leave blower, fan, etc. In addition, one, two or more air mats can be selected with different size openings depending on the drying needs. The temperature, speed and pressure of the drying air flow is adjusted via movement of the air flow from larger-to-smaller openings and from smaller-to-larger openings are is governed by the Universal Gas Law and the Bernoulli principles.

For example, for maximum drying a first air mat 20 with smaller openings 22 would be selected to be placed over the plural air chamber dividers and a second air mater 24 with larger openings 26 would be placed over the first air mat 20. A heater providing heated air would be connected to opening 18. The change in air flow from the smaller openings 22 to the larger openings 26 would provide a drying air flow with a slower speed, a higher pressure, and a higher temperature along with the hot air flow. The same configuration could be used with a cool air flow to provide a drying air flow that would not be as hot that provided by the heater. Other various combinations of the air mats 20, 24 with the various size openings and various different hot, warm, cool, cold etc. air flow sources can also be used to practice the invention.

In another embodiment of the invention, the plural openings of the second size 26 are the same size as the plural openings of the first size 22. The plural openings of the second size 26 directly overlap one or more plural openings of the first size 22.

In one embodiment, a first desired order of the first 20 and second 24 air mats is used. The first air mat 20 with the smaller openings 22 is placed in the base 12 in a first lower position directly on and in direct contact with the air chamber dividers 14. The second air mat 24 with the larger openings is placed in a second higher position on top of and in direct contact with the first air mat 20. This configuration is used to obtain a slower drying speed, but with a higher drying pressure. This is the configuration illustrated in FIG. 1A and FIGS. 2-5.

In another embodiment, a second desired order of the first 20 and second 24 air mats is used. The second air mat 24 with the larger openings 26 is placed in the base 12 in a first lower position directly on and in direct contact with the air chamber dividers 14. The first air mat 20 with the smaller openings 22 is placed in a second higher position on top of and in direct contact with the second air mat 24. This configuration is used to obtain a faster drying speed, but with a lower drying pressure. This is the configuration illustrated in FIG. 1B and FIGS. 6-8.

In one embodiment of the invention, the second air mat 24 comprises a flexible rubberized material. The flexible rubberized material is capable of supporting the weight of a hoofed animal and is soft and flexible. However, the present invention is not limited to such an embodiment and other materials such as plastic, metals, composite materials and wood can be used for the second air mat 24.

In one embodiment, the top air mat used in the apparatus 10 always includes a flexible material to provide a top portion that will provide the least amount of pain for a hoofed animal with a diseased or damaged hoof. In another embodiment, all air mats used in the apparatus 10 include a flexible material.

In one embodiment of the invention, the hoof drying apparatus 10 includes both the first air mat 20 and the second air mat 24. In another embodiment of the invention, the hoof drying apparatus 10 includes only the first air mat 20. In yet another embodiment of the invention, the hoof drying apparatus 10 includes only the second air mat 24. In another embodiment, the apparatus 10 includes the first air mat 20, the second air mat 24 and one or more other air mats (e.g., 24', etc.).

In another embodiment, the raised base platform 12, first air mat 20 and/or the second air mat 24 include magnetic materials and/or plural embedded magnets 41. FIG. 1B illustrates magnets 41 embedded only on two sides of the raised 13. However, the present invention is not limited to this embodiment and other embodiments, with more, fewer or other magnets 41 can also be used to practice the invention.

As is known in the animal arts, magnetic therapy is used to treat many ailments. General uses of magnetic therapy include relief of pain and discomfort, reduction of inflammation, improved circulation, the ability to fight infections and acceleration of healing. The magnetic materials are used to help treat hoof ailments, if any, while one or more hoofs are being dried. However, the present invention is not limited to these embodiments and the invention can be practiced without magnetic materials for embedded magnets.

In another embodiment, only one air mat with plural layers is used. A first layer includes a plural openings of a first size placed on top of the plural of air chamber dividers 14 in the raised based platform and a second layer with a plural openings of a second size are aligned on top of the plural openings of the second size. The second size is different from the first size.

The hoof drying apparatus 10 allows a hoof from a hoofed animal to be dried completely including a bottom, side and top portion of a hoof. The components of the hoof drying apparatus 10 direct air flow to completely dry one or more hoofs that are placed upon the hoof dryer 10.

Figure 2:
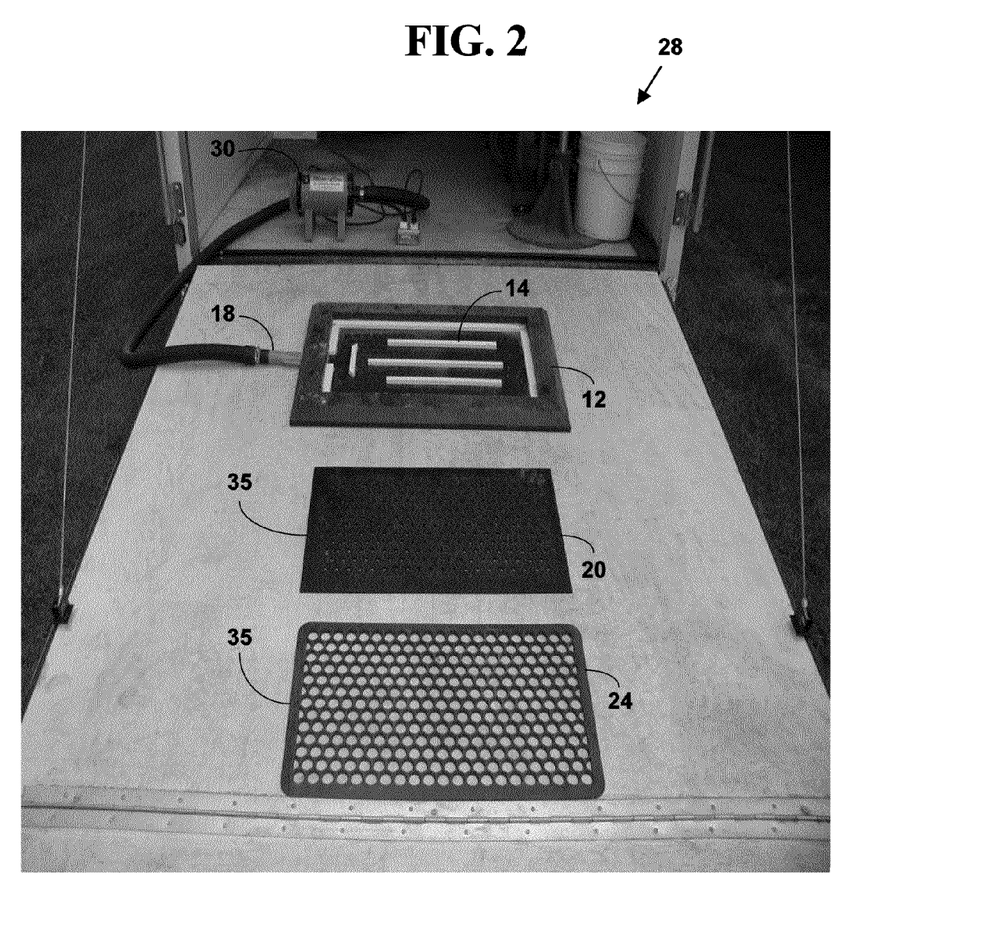
FIG. 2 is a block diagram of an exploded top view of the hoof drying apparatus of FIG. 1.

FIG. 2 is a block diagram of an exploded top view 28 of the hoof drying apparatus of FIG. 1. FIG. 2 illustrates a first air mat 20 and a second air mat 24 comprising a compressible rubberized material 35.

Figure 3:
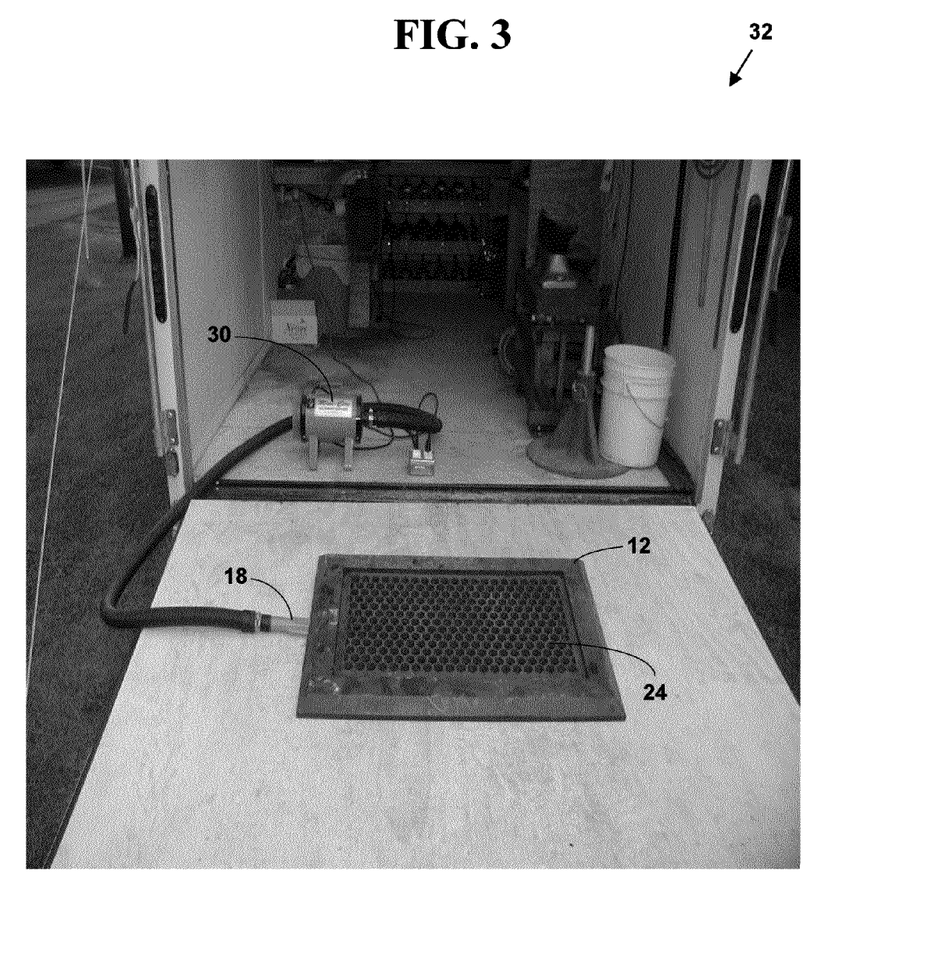
FIG. 3 is a block diagram of a non-exploded top view of the hoof drying apparatus of FIG. 1.

FIG. 3 is a block diagram of a non-exploded top view 32 of the hoof drying apparatus 10 of FIG. 1.

In FIG. 3, the components described for FIG. 1 are placed together in a desired ordering and drying configuration in their respective places and ready for use to dry the hoofs of a hoofed animal such as a horse, cow, buffalo, antelope, etc. FIGS. 2 and 3 illustrate an external drying device 30 that is capable of blowing hot, warm, cool or cold air into the hollow air connector 18 in the first space 16. The air from the external drying device 30 is directed by the plural air chamber dividers 14 into the first inner portion space 16 and subsequently through the plural openings of the first size 22 in the first air mat 20 and the plural openings of the second size 26 in the second air mat 24.

In FIGS. 2 and 3, the external drying device 30 includes an electronic dryer. However, the external drying device 30 can also include a manual drying device such as a hand-operable device (e.g., a hand-pump, etc.).

FIG. 2 and FIG. 3 illustrate a hoof drying apparatus 10 illustrating components 12, 20 and 24 comprising the rigid and flexible rubberized materials as described above for FIG. 1 above. However, the present invention is not limited to such an embodiment and other materials such as plastic, metals, mylar, composite materials, expanded metals 39 and wood can be used for the hoof dryer 10.

FIG. 3 illustrates use of the hoof drying apparatus 10 in a trailer of a farrier (i.e., a professional "horse shoer"). FIG. 3 illustrates a hoof drying apparatus 10 that was specifically sized and shaped to accommodate two hoofs of a specific sized horse simultaneously. For example, two hoofs of the two back or front legs of a horse can be placed simultaneously on the hoof dryer 10. However, the present invention is not limited to such an embodiment and the hoof drying apparatus 10 can be specifically sized and shaped to accommodate, more (e.g., all four) or fewer (e.g., one) of a hoofed animal.

Figure 4:
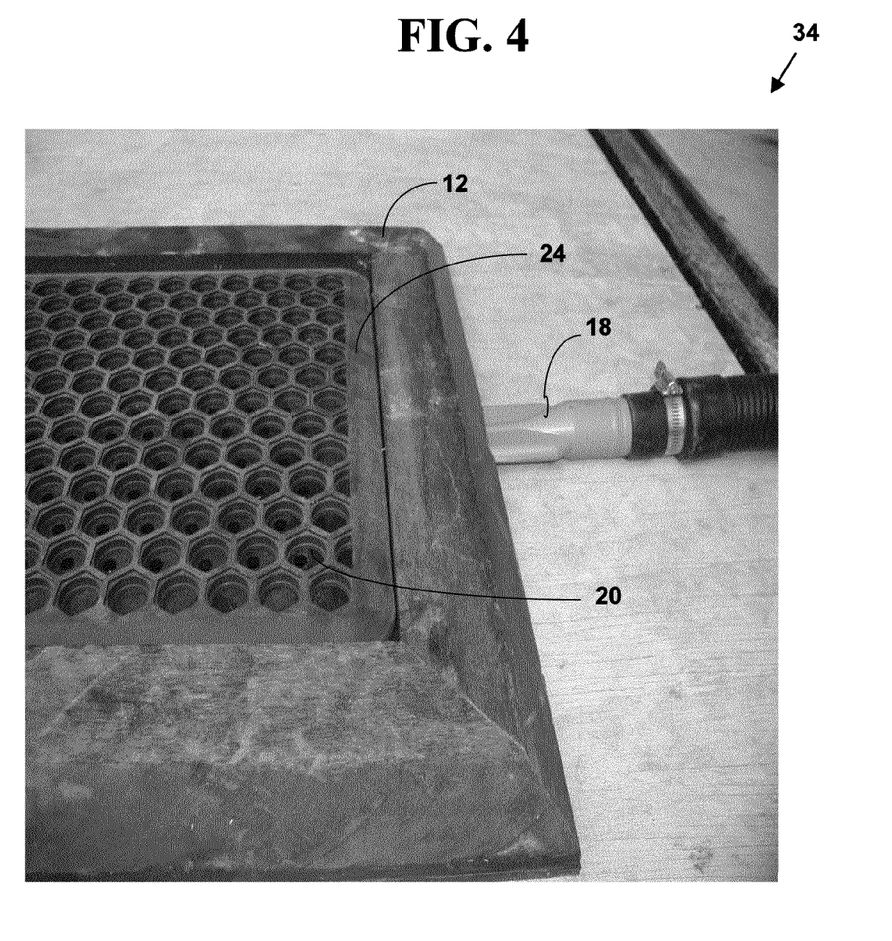
FIG. 4 is a block diagram of a portion of a top view a hoof drying apparatus of FIG. 1.

FIG. 4 is a block diagram of a close-up portion of a top view 34 a hoof drying apparatus 10 of FIG. 1.

FIG. 5 is a block diagram of a top view 36 of a hoof drying apparatus 10 of FIG. 1 comprising components of other materials. These materials are different than those used for FIG. 2.

In FIG. 5, the raised platform 12 comprises wood, the first air mat 20 comprises a hard myler 37 or Formica type material and the second air mat 24 comprises a flexible rubberized material 35. This embodiment is exemplary only and the present invention is not limited to this embodiment. Various combinations of various types of materials can be used to practice the invention.

FIG. 6 is a block diagram of a top view 38 of a first air mat 20 made out of expanded metal 39. As is known in the art, "expanded metal" is metal in which openings are punched and then the metal is stretched to expand the openings. This embodiment is exemplary only and the present invention is not limited to this embodiment.

FIG. 7 is a block diagram of an expanded top view 40 of the hoof drying apparatus 10 of FIG. 1.

In FIG. 7 the raised platform 12 comprises a rubberize material, the first air mat 20 comprises an expanded metal material 39 and the second air mat 24 comprises a flexible rubberized material 35. This embodiment is exemplary only and the present invention is not limited to this embodiment. Various combinations of various types of materials can be used to practice the invention. In such an embodiment, the openings 22 in the first air mat 20 in the expanded metal 39 are larger than the openings 26 in the second air mat 24.

FIG. 8 is a block diagram of an non-exploded top view 42 of a hoof drying apparatus 10 of FIG. 1 comprising components of other materials. These materials are different than those used for FIG. 2.

In FIG. 8, the raised platform 12 comprises a rubberize material, the first air mat 20 comprises an expanded metal material 39 and the second air mat 24 comprises a flexible rubberized material. This embodiment is exemplary only and the present invention is not limited to this embodiment.

In another embodiment, the first air mar 20 and the second air mat 24 are combined into a single combination air mat comprising plural sets of openings of two different sizes. In such an embodiment, the combination air mat includes a first layer with openings of a first size and a size layer with openings of a second size.

Figure 9A:
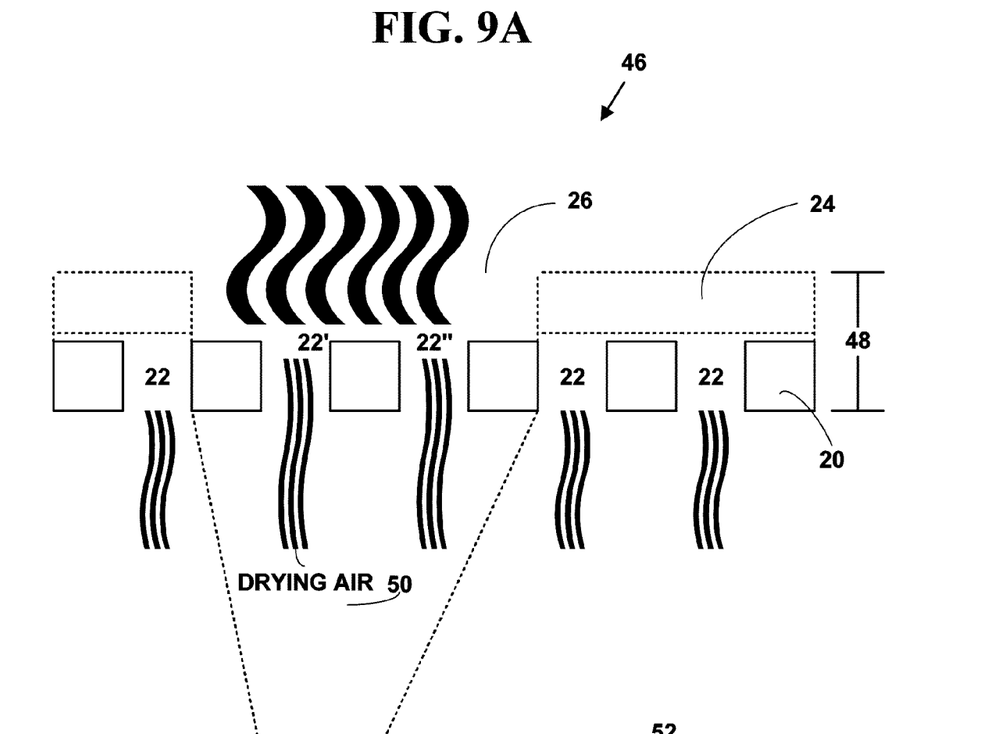
FIG. 9A is a block diagram illustrating cross-section view of a portion of an exemplary combination air mat.

FIG. 9A is a block diagram 46 illustrating cross-section view of a small portion of an exemplary combination air mat 48. The combination air mat 48 is created by permanently or temporarily connecting two or more air mats (e.g., with an adhesive, such as a glue, etc. a connector such as a screw, bolt, pin, nail, bungy chord, wire, rope, rubber band, etc.). In one embodiment, the combination air mat 48 is created in a factory during a manufacturing process by permanently creating two or more air mats. In another embodiment, the combination air mat is created by a user by temporarily combining two or more air mats.

As is illustrated in FIG. 9A the combination air mat has smaller openings 22 (five of which are illustrated in FIG. 9A) in a first lower portion 20 (solid lines) in a bottom position (i.e., placed directly on top of dividers 14) and larger openings 26 (one of which is illustrated) in a second higher portion 24 (dashed lines). One larger opening 26 aligns with two smaller openings 22' and 22". The drying air flow 50 is forced from the smaller openings 22 into the larger openings 26.

However, the combination air mat 48 illustrated in FIG. 9A is also configurable and selectable by allowing the combination air mat 48 to be turned upside down from the configuration illustrated in FIG. 9 so the second portion 24 with the larger openings 26 in a bottom position (i.e., placed directly on top of dividers 14) and a the first portion 20 with the smaller openings 22 is in a top position.

Figure 9B:
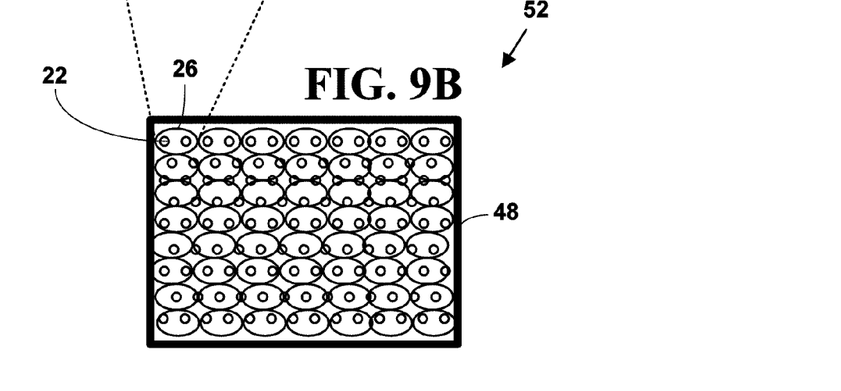
FIG. 9B is a block diagram illustrating a top view of a portion of the exemplary combination air mat of FIG. 9A.

FIG. 9B is a block diagram 52 illustrating a top view of a portion of the exemplary combination air mat 48 of FIG. 9A.

Various different or identical types of materials (e.g., compressible rubber 35, mylar, 37 expanded metal 39, etc.) can be selected for the combined air mat 48 and the separate first and second air mats 20, 24, with different or identical sized and/or shaped openings and various orderings of the first and second air mats 20, 24 in the base 12 can be used to practice the invention. The present invention is not limited to the configurations described.

The hoof drying apparatus 10 is specifically sized and shaped to accommodate one or more hoofs of a hoofed animal. The hoof drying apparatus is also designed to dry hooves for the purposes of: hoof wall repair, preparation for medication for hoof diseases and preparation of the hoof for application of hoof dressings and hoof shoes.

In one embodiment of the invention, the hoof drying apparatus 10 is portable and specifically designed and sized to accommodate either one, two or four hoofs a horse or other hoofed animal. The hoof drying apparatus 10 is used by a blacksmith or a farrier to dry hoofs before the horse is shoed.

In another embodiment of the invention, the hoof drying apparatus 10 is used by veterinarians to dry the hoofs of hoofed animals before applying medications.

In another embodiment of the invention, the hoof drying apparatus 10 is not portable is used in a fixed structure such as a barn, farrier shop, veterinary clinic, etc. In such an embodiment, the hoof drying apparatus 10 is permanently mounted to a floor.

In the embodiments illustrated, the hoof drying apparatus 10 is illustrated as rectangular in shape. However, the present invention is not limited to rectangular shapes and other shapes can also be used to practice the invention (e.g., square, circular, triangular, etc).

Figure 10:
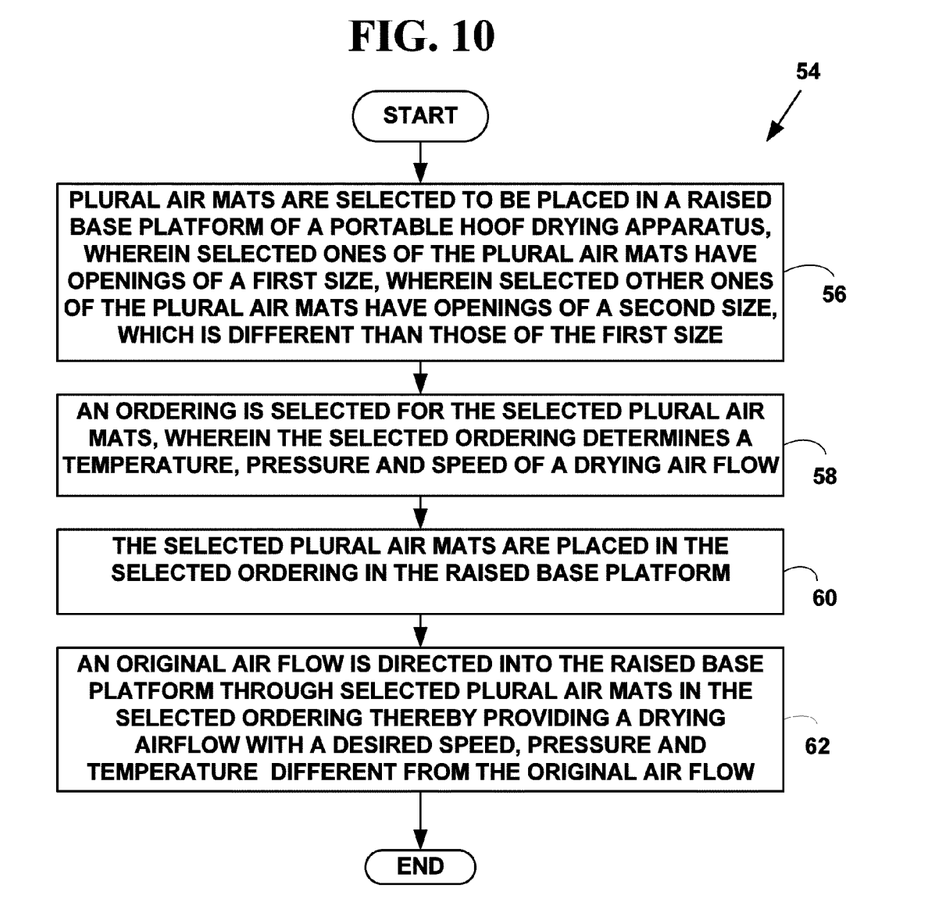
FIG. 10 is a flow diagram illustrating a method for drying hoofs of a hoofed animal with a hoof drying apparatus.

FIG. 10 is a flow diagram illustrating a Method 54 for drying hoofs of a hoofed animal with a hoof drying apparatus. At Step 56, plural air mats are selected to be placed in a raised base platform of the hoof drying apparatus. Selected ones of the plural air mats have openings of a first size. Selected other ones of the plural air mats have openings of a second size, which is different than those of the first size. At Step 58, an ordering is selected for the selected plural air mats. The selected ordering determines a temperature, pressure and speed of a drying air flow. At Step 60, the selected plural air mats are placed in the selected ordering in the raised base platform. At Step 62, an original air flow is directed into the raised base platform through selected plural air mats in the selected ordering thereby providing a drying airflow with a desired speed, pressure and temperature different than the original air flow.

Method 54 is illustrated with one exemplary embodiment. However, the present invention is not limited to this embodiment and other embodiments may also be used to practice the invention.

In such an exemplary embodiment at Step 56, plural air mats (e.g., 20, 24, etc.) are selected to placed in a raised base platform 12. Selected ones of the plural air mats 20 have openings of a first size 22. Selected other ones of the plural air mats 24 have openings of a second size 26, which is different than those of the first size 22. This example is illustrated with only two air mats selected. However, the present invention is not limited to two airs and more airs (e.g., 20, 24, 24', etc.) or a combination air mat 48, with one or more other air mats can also be used to practice the invention.

In one embodiment, the plural air mats 20, 24 are selected from plural air mats of different materials 35, 37, 39, etc. each with different size openings 22, 26, etc.

At Step 58, an ordering is selected for the selected plural air mats 20, 24. The selected ordering determines a temperature, pressure and speed of a drying air flow. Changing a selected ordering changes a desired temperature, pressure and speed of the drying air flow.

At Step 60, the selected plural air mats 20, 24 are placed in the selected ordering in the raised base platform 12.

For example, a first selected ordering includes placing a first air mat 20 with smaller size openings 22 in a lower position directly on top of and in contact with the plural air divider 14 and a second air mat 24 with larger size openings 26 in a second higher position on top of an in direct contact with the first air mat 20 in the raised base platform 12. The change in size from the smaller openings 22 in the first air mat 20 to the larger opening size 26 in the second air mat 24 also changes the air flow speed and pressure (i.e., slower speed, higher pressure, higher temperature) which helps to dry hoofs with a first desired drying air flow.

For example, a second selected ordering includes placing a second air mat 24 with larger size openings 26 in a lower position in contact with the plural air divider 14 and a first air mat 20 with smaller size openings 22 in a second higher position on top of an in direct contact with the second air mat 20. The change in size from larger openings 26 in the second air mat 24 to smaller opening size the first air mat 20 also changes the drying air flow speed, pressure and temperature (i.e., faster speed, lower pressure, lower temperature) which helps to dry hoofs with second desired drying air flow.

At Step 62, an original air flow is directed into the raised base platform 12 via the hollow air connector 18 via the plural air dividers 14 through selected plural air mats 20, 24 in the selected ordering thereby providing a drying airflow with a desired speed, pressure and temperature for drying hoofs of hoofed animals. The drying airflow is different than the original air flow. This allow a hot, warm (heater, etc.) cool or cold (e.g., reversed vacuum cleaner, etc.) air source to be used and still achieve a desired drying air flow speed, pressure and temperature based on the selected air mats and selected ordering of the air mats. The selection of the plural air mats of different materials with different sized openings and the selection of the ordering of the air mats placed in the drying apparatus 10 are quickly and easily changeable by a user.

The drying components of the apparatus are selectable, configurable and inter-changeable for desired drying needs and change a pressure, speed and temperature of an original drying air source. Therefore it can be used with a hot/warm/cool/cold air drying source.

It should be understood that the components described herein are not related or limited to any particular type of materials unless indicated otherwise. Various combinations of general purpose, specialized or equivalent materials and components and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

While various elements of the preferred embodiments have been described as being implemented with certain components and materials, in other embodiments other implementations and/or combinations or components and materials may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A portable hoof drying apparatus, comprising in combination:
   a portable raised base platform including a first inner hollow portion within a second solid raised portion, wherein
   the first inner hollow portion includes a plurality of air chamber dividers for directing a drying air flow, wherein the plurality of air chamber dividers comprise a compressible material, wherein the compressible material is compressible when a weight is applied but is capable of supporting weight of a heavy hoofed animal without collapsing, and wherein,
   a height of the second solid outer raised portion is specifically sized to allow easy step access by a hoofed animal and to allow the placement of a plurality of air mats to be placed within the second solid outer portion and over the plurality of air chamber dividers in the first hollow portion;
   a hollow air connector connected through a portion of the raised based platform, wherein a first end outside the raised based platform is connected to a drying air source and a second end inside the raised based platform directs a drying air into the plurality of air chambers of the first inner hollow portion and up and through a plurality of air mats stacked on top of the plurality of air chamber dividers in a pre-determined configurable ordering,
   wherein the drying air flow from the hollow air connector is directed into the plurality of air chamber dividers, through a plurality of different size openings in the plurality of air mats stacked in the pre-determined configurable ordering thereby drying a bottom portion, one or more side portions and a top portion of one or more hoofs of a hoofed animal and
   a plurality of air mats specifically sized and shaped to fit within the second solid outer portion and fully cover an area of the first inner hollow portion from a left side to right side and a top side to a bottom side, each of the plurality of air mats including a plurality of openings, wherein selected ones of the plurality of air mats include a plurality of smaller sized openings and other selected ones of the plurality of air mats including a plurality of larger sized openings,
   wherein directing the drying air flow through a plurality of different size openings in the plurality of air mats stacked in the pre-determined configuration ordering changes a temperature, a speed and a pressure of the drying air flow, thereby providing an additional drying air currents as drying air is forced through and between the plurality of different sized openings of the plurality of air mats, wherein an ordering of the plurality of air mats stacked in the pre-determined configuration ordering can be changed by changing positions of the plurality of air mats in the ordering within the portable raised base platform, thereby changing a flow of the drying air flow through the plurality of openings of the smaller size and the plurality of openings of a larger size, thereby changing a temperature, a speed and a pressure of the drying air flow through the portable raised base platform, wherein a selected air mat in a top position in the plurality of air mats stacked in the pre-determined configurable ordering comprises a compressible material, wherein the compressible material is compressible by the hoofed animal when weight of the hoofed animal is applied, thereby providing a surface that is comfortable for hoofed animal as the one or more hoofs are dried and particularly when one or more hoofs are sensitive or diseased.

2. The portable hoof drying apparatus of claim 1 wherein the raised base platform, and the plurality of air mats comprise materials including a rigid rubberized material, a flexible rubberized material, plastic, expanded metal, metal, composite material, mylar or wood materials.

3. The portable hoof drying apparatus of claim 1 wherein the plurality of air chambers are selectively removable and moveable to a plurality of different positions within the raised base platform.

4. The portable hoof drying apparatus of claim 1 wherein an additional air cushion and drying air flow current is created as the drying air flow is forced out of a plurality of smaller size openings in a first air mat into a plurality of larger size openings of the second size on a second air mat.

5. The portable hoof drying apparatus of claim 1 wherein the drying air source includes a plurality of drying air sources comprising a hot, warm, cool or cold drying air source.

6. The portable hoof drying apparatus of claim 5 wherein a type of drying air source is selected based on plurality of different size openings in the plurality of air mats stacked in the pre-determined configuration ordering.

7. The portable hoof drying apparatus of claim 1 wherein the raised based platform or selected ones of the plurality of air mats comprise magnetic materials or a plurality of embedded magnets.

8. The portable hoof drying apparatus of claim 1 wherein a flow of an original drying air flow from a first air mat with a plurality of smaller size openings through a second air mat with a plurality of larger size openings stacked in the pre-determined configuration ordering creates a new drying air flow with a slower speed, a higher pressure and a higher temperature than the original air flow.

9. The portable hoof drying apparatus of claim 1 wherein a flow of the drying air flow from a first air mat with a plurality of larger size openings through a second air mat with a plurality of smaller size openings stacked in the pre-determined configuration ordering creates a new drying air flow with a higher speed, a lower pressure and a lower temperature than the original air flow.

10. The portable hoof drying apparatus of claim 1 wherein the plurality of air mats stacked in the pre-determined configuration ordering can be selected from a plurality of air mats comprising different materials.

11. The portable hoof drying apparatus of claim 1 wherein the plurality of air mats stacked in the pre-determined configuration ordering can be selected from a plurality of air mats comprising a plurality of openings of different sizes.

12. The portable hoof drying apparatus of claim 1 wherein a first air mat with a plurality of openings of a first size is connected to a second air mat with a plurality of openings with a size different from the plurality of openings of first size to form a combined air mat, wherein the combined air mat is reversible and can be placed in the portable raised base platform in one of two configuration, a first configuration with first air mat portion of the combined air mat in a top position or a second configuration with the second air mat portion of the combined air mat in the top position, wherein the first configuration and second configuration provide different air pressures, air speeds and air temperatures of the drying air flow.

* * * * *